United States Patent
Kumar et al.

(10) Patent No.: US 11,010,359 B2
(45) Date of Patent: *May 18, 2021

(54) MULTI-ENTITY NORMALIZATION

(71) Applicant: BMC Software, Inc., Houston, TX (US)

(72) Inventors: Ajoy Kumar, Santa Clara, CA (US); Douglas Mueller, Palo Alto, CA (US); Josie George, Pune (IN)

(73) Assignee: BMC Software, Inc., Houston, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/407,974

(22) Filed: May 9, 2019

(65) Prior Publication Data
US 2019/0266135 A1  Aug. 29, 2019

Related U.S. Application Data

(63) Continuation of application No. 15/436,144, filed on Feb. 17, 2017, now Pat. No. 10,324,912, which is a continuation of application No. 13/842,072, filed on Mar. 15, 2013, now Pat. No. 9,613,070.

(51) Int. Cl.
| | |
|---|---|
| *G06F 16/215* | (2019.01) |
| *G06F 16/00* | (2019.01) |
| *G06F 16/23* | (2019.01) |
| *G06F 16/901* | (2019.01) |

(52) U.S. Cl.
CPC .......... *G06F 16/215* (2019.01); *G06F 16/00* (2019.01); *G06F 16/23* (2019.01); *G06F 16/9024* (2019.01)

(58) Field of Classification Search
CPC ........ G06F 16/215; G06F 16/23; G06F 16/00; G06F 16/9024
USPC ................. 707/722, 737, 736, 705
See application file for complete search history.

(56) References Cited

U.S. PATENT DOCUMENTS

| | | |
|---|---|---|
| 7,403,942 B1 | 7/2008 | Bayliss |
| 8,499,170 B1 | 7/2013 | Tongshu et al. |
| 9,613,070 B2 | 4/2017 | Kumar et al. |
| 2003/0050915 A1 | 3/2003 | Allemang et al. |
| 2007/0005654 A1 | 1/2007 | Schachar et al. |

(Continued)

OTHER PUBLICATIONS

U.S. Appl. No. 13/842,072, filed Mar. 15, 2013, Patented.
U.S. Appl. No. 15/436,144, filed Feb. 17, 2017, Allowed.

*Primary Examiner* — Robert W Beausoliel, Jr.
*Assistant Examiner* — Pedro J Santos
(74) *Attorney, Agent, or Firm* — Brake Hughes Bellermann LLP

(57) ABSTRACT

In accordance with aspects of the disclosure, systems and methods are provided for normalizing data representing entities and relationships linking the entities including defining one or more graph rules describing searchable characteristics for the data representing the entities and relationships linking the entities, applying the one or more graph rules to the data representing the entities and the relationships linking the entities, identifying one or more matching instances between the one or more graph rules and the data representing the entities and the relationships linking the entities, and performing one or more actions to update the one or more matching instances between the one or more graph rules and the data representing the entities and the relationships linking the entities.

20 Claims, 8 Drawing Sheets

(56) References Cited

U.S. PATENT DOCUMENTS

| | | |
|---|---|---|
| 2007/0089037 A1* | 4/2007 | Jiang .................... H04L 1/0045 |
| | | 714/776 |
| 2007/0156767 A1 | 7/2007 | Hoang et al. |
| 2009/0132503 A1 | 5/2009 | Sun et al. |
| 2010/0179945 A1 | 7/2010 | Rangarajan et al. |
| 2010/0228764 A1 | 9/2010 | Sallakonda et al. |
| 2012/0310905 A1 | 12/2012 | Hans et al. |
| 2013/0218898 A1 | 8/2013 | Raghavan et al. |
| 2013/0218899 A1 | 8/2013 | Raghavan et al. |
| 2013/0238631 A1 | 9/2013 | Carmel et al. |
| 2014/0280130 A1 | 9/2014 | Kumar et al. |
| 2014/0283096 A1 | 9/2014 | Neerumalla et al. |

* cited by examiner

MULTI-ENTITY NORMALIZATION

RELATED APPLICATION

This application is a continuation application of U.S. application Ser. No. 15/436,144, filed Feb. 17, 2017, entitled "Multi-Entity Normalization", which is a continuation application of U.S. application Ser. No. 13/842,072, filed Mar. 15, 2013, now U.S. Pat. No. 9,613,070, entitled "Multi-Entity Normalization", which are hereby incorporated by reference in their entireties.

TECHNICAL FIELD

The present description relates to multi-entity normalization.

BACKGROUND

In resource management, data stored in databases can be obtained from discovery providers, and data integration can be inconsistent and incomplete. Data stored in databases may include individual configuration items (CIs) and integrated CIs that may be connected. Maintaining connections between CIs can be difficult due to complexity of integration and errors related to integrated CIs. Sometimes, connection and integration errors can be fixed in a highly labor intensive way by browsing through data and looking for trouble spots. Further, when such errors occur, data quality can suffer and impact applications that utilize this data. Therefore, there exists a need to improve data quality by improving maintenance of connections for integrated CIs.

SUMMARY

In accordance with aspects of the disclosure, a computer system may be provided for multi-entity normalization including instructions stored on a non-transitory computer-readable medium and executable by at least one processor. The system may include a normalization engine configured to cause the at least one processor to normalize data representing entities and relationships linking the entities. The normalization engine may include a rule definition module configured to define one or more graph rules describing searchable characteristics for the data representing the entities and the relationships linking the entities. The normalization engine may include a rule application module configured to apply the one or more graph rules to the data representing the entities and the relationships linking the entities and identify one or more matching instances between the one or more graph rules and the data representing the entities and the relationships linking the entities. The normalization engine may include a rule action module configured to perform one or more actions to update the one or more matching instances between the one or more graph rules and the data representing the entities and the relationships linking the entities.

In accordance with aspects of the disclosure, a computer-implemented method may be provided for multi-entity normalization. The method may include defining one or more graph rules describing searchable characteristics for data representing entities and relationships linking the entities, applying the one or more graph rules to the data representing the entities and the relationships linking the entities, identifying one or more matching instances between the one or more graph rules and the data representing the entities and the relationships linking the entities, and performing one or more actions to update the one or more matching instances between the one or more graph rules and the data representing the entities and the relationships linking the entities.

In accordance with aspects of the disclosure, a computer program product may be provided, wherein the computer program product is tangibly embodied on a non-transitory computer-readable storage medium and includes instructions that, when executed by at least one processor, may be configured to define one or more graph rules describing searchable characteristics for data representing entities and relationships linking the entities, apply the one or more graph rules to the data representing the entities and the relationships linking the entities, identify one or more matching instances between the one or more graph rules and the data representing the entities and the relationships linking the entities, and perform one or more actions to update the one or more matching instances between the one or more graph rules and the data representing the entities and the relationships linking the entities.

The details of one or more implementations are set forth in the accompanying drawings and the description below. Other features will be apparent from the description and drawings, and from the claims.

DETAILED DESCRIPTION

In various implementations, aspects of the disclosure provide a system and methods for multi-entity normalization. The multi-entity normalization may refer to data cleaning technologies for normalizing multiple entities in various database environments and interrelationships among the entities and cleaning graph models associated with the entities and interrelationships among the entities. The entities may include configuration items (CIs) and interrelationships among the CIs. Accordingly, aspects of the disclosure may provide the system and methods for ensuring that graph models of entities (e.g., CIs) and relationships among the entities may be validated against one or more graph rules and corrected to result in clean graph models. Further, aspects of the disclosure may provide a normalization engine for multi-entity attribute correction that considers graph based pattern matching with multi-entity normalization. As described herein, aspects of the disclosure may be configured to define graph rules relating to multiple entities and relationships among the entities, applying the graph rules to the entities and relationships among the entities, and taking actions to update and/or correct the multiple entities and relationships among the entities. In some implementations, each graph rule may include a pattern of entities and relationships among the entities that may be described as a graph model including one or more semantic properties that the graph model may satisfy. In some other implementations, taking action may include auto-correcting graph models and/or suggesting candidates for correction when, for example, one or more of the graph rules identify exceptions, which may result in notification.

Figure 1:
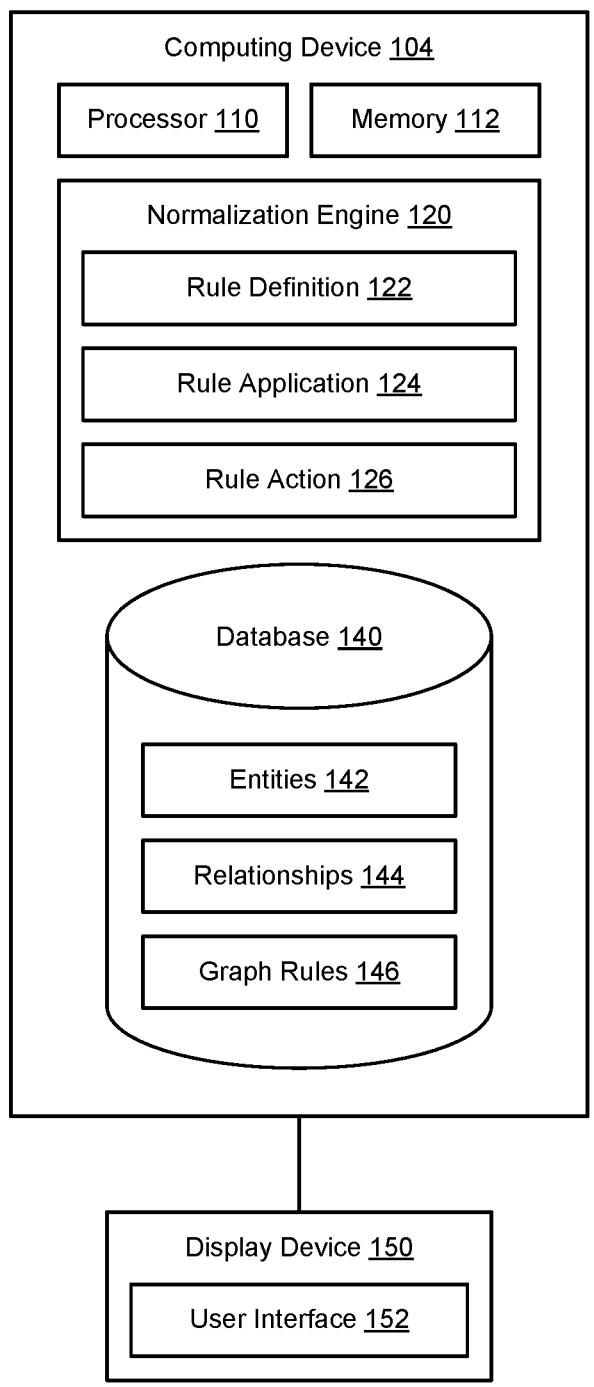
FIG. 1 is a block diagram illustrating an example system for multi-entity normalization, in accordance with aspects of the disclosure.

FIG. 1 is a block diagram illustrating an example system 100 for multi-entity normalization, in accordance with aspects of the disclosure. In the example of FIG. 1, the system 100 may comprise a computer system for implementing a system for multi-entity normalization that may be associated with a computing device 104, thereby transforming the computing device 104 into a special purpose machine designed to implement multi-entity normalization process(es) and techniques, as described herein. In this sense, the computing device 104 may include any standard element(s) and/or component(s), including at least one processor(s) 110, memory 112 (e.g., non-transitory computer-readable storage medium), one or more database(s) 140, power, peripherals, and various other computing element(s) and/or component(s) that may not be specifically shown in FIG. 1. Further, the system 100 may be associated with a display device 150, such as, for example, a monitor or other display) that may be used to provide a user interface (UI) 152, such as a graphical user interface (GUI). In an implementation, the UI 152 may be used to receive preferences, parameters, and/or various input information from a user for implementing and/or using the system 100. As such, various other element(s) and/or component(s) of the system 100 that may be useful to implement and/or use the system 100 may be added, inserted, or included, as would be apparent to one of ordinary skill in the art.

Accordingly, the multi-entity normalization system 100 of FIG. 1 may include the computing device 104 and instructions recorded on the memory 112 (e.g., non-transitory computer-readable medium) and executable by the at least one processor 110. Further, the multi-entity normalization system 100 may include the display device 150 for providing output to a user, and the display device 150 may include the user interface (UI) 152 for receiving input from the user.

In the example of FIG. 1, the system 100 may include a normalization engine 120 that may be configured to cause the at least one processor 110 to normalize data representing entities 142 and relationships 144 linking the entities 142. The data representing the entities 142 and the relationships 144 linking the entities 142 may be stored in a database, such as, for example, in one or more of the databases 140. In various examples, the one or more databases 140 may include any type of database including a relational database, such as a configuration management database (CMDB).

In various implementations, configuration items (CIs) may be utilized to represent data for the entities 142 and the relationships 144 linking the entities 142. For example, a CI may be utilized to represent data for each entity, and a same or different CI may be utilized to represent data for each relationship linking each entity. Accordingly, each entity may be represented with a CI, and each relationship may be represented with a same or different CI linking each entity with a related CI.

In an implementation, the normalization engine 120 may include a rule definition module 122 configured to define one or more graph rules 146 describing searchable characteristics for the data representing the entities 142 and the relationships 144 linking the entities 142. In various examples, the one or more graph rules 146 may be stored in a database, such as, for instance, in one or more of the databases 140.

In various examples, the one or more graph rules 146 may be configured to define one or more searchable characteristics for the data representing the entities 142 and the relationships 144 linking the entities 142. For example, the one or more graph rules 146 describing searchable characteristics may include describing at least one pattern related to the data representing the entities 142 and the relationships 144 linking the entities 142. In another example, the one or more graph rules 146 describing searchable characteristics may include describing at least one semantic property related to the data representing the entities 142 and the relationships 144 linking the entities 142. In another example, the one or more graph rules 146 describing searchable characteristics may include specifying at least one of an inclusion dependency and an exclusion dependency related to the data representing the entities 142 and the relationships 144 linking the entities 142. In another example, the one or more graph rules 146 describing searchable characteristics may include specifying at least one attribute constraint related to the data representing the entities 142 and the relationships 144 linking the entities 142. In another example, the one or more graph rules 146 describing searchable characteristics may include specifying at least one data value related to the data representing the entities 142 and the relationships 144 linking the entities 142. In another example, the one or more graph rules 146 describing searchable characteristics may include specifying at least one token based approximation related to the data representing the entities 142 and the relationships 144 linking the entities 142. These examples and various other examples are described in greater detail herein in reference to FIGS. 3-8.

In an implementation, the normalization engine 120 may include a rule application module 124 configured to apply the one or more graph rules 146 to the data representing the entities 142 and the relationships 144 linking the entities 142. The rule application module 124 may be configured to identify one or more matching instances between the one or more graph rules 146 and the data representing the entities 142 and the relationships 144 linking the entities 142. In an example, identifying the one or more matching instances may include identifying one or more matching instances having one or more discrepancies between the one or more graph rules 146 and the data representing the entities 142 and the relationships 144 linking the entities 142. In another example, identifying the one or more discrepancies may include flagging and/or logging the one or more discrepancies as exceptions for analysis.

Accordingly, in various examples, the rule application module 124 may be configured to identify one or more discrepancies between the one or more graph rules 146 and the data representing the entities 142 and the relationships 144 linking the entities 142, and the rule action module 126 may be configured to perform the one or more actions to mitigate the one or more discrepancies identified between the one or more graph rules 146 and the data representing the entities 142 and the relationships 144 linking the entities 142. These and various other examples are described herein.

In an implementation, the normalization engine 120 may include a rule action module 126 configured to perform one or more actions to update the one or more matching instances between the one or more graph rules 146 and the data representing the entities 142 and the relationships 144 linking the entities 142. In various examples, performing the one or more actions to update the one or more matching instances may include at least one of generating a notification for the one or more matching instances, auto-correcting the one or more matching instances, and adjusting one or more attributes related to the one or more matching instances. In other various examples, performing the one or more actions to update the one or more matching instances may include cleaning the data by performing at least one of modifying one or more relationships linking the entities, modifying one or more entities, generating one or more additional entities, generating one or more additional relationships linking the entities.

In other examples, performing the one or more actions to update the one or more matching instances may include performing one or more actions to mitigate one or more discrepancies and may include at least one of generating a notification for the one or more discrepancies, auto-correcting the one or more discrepancies, and adjusting one or more attributes related to the one or more discrepancies. In some other examples, performing the one or more actions to update the one or more matching instances may include performing one or more actions to mitigate one or more discrepancies and may include at least one of modifying one or more relationships 144 linking the entities 142, modifying one or more entities 142, generating one or more additional entities 142, generating one or more additional relationships 144 linking the entities 142. These and various other examples are described herein.

In the example of FIG. 1, it should be appreciated that the multi-entity normalization system 100 is shown using various functional blocks or modules that represent more-or-less discrete functionality. However, such illustration is provided for clarity and convenience, and therefore, various functionalities may overlap or may be combined within a described block(s) or module(s), and/or may be implemented by one or more block(s) or module(s) not shown in the example of FIG. 1. Generally, it should be appreciated that conventional functionality that may be considered useful to the system 100 of FIG. 1 may be included as well even though such conventional elements are not shown explicitly, for sake of clarity and convenience.

Figure 2:
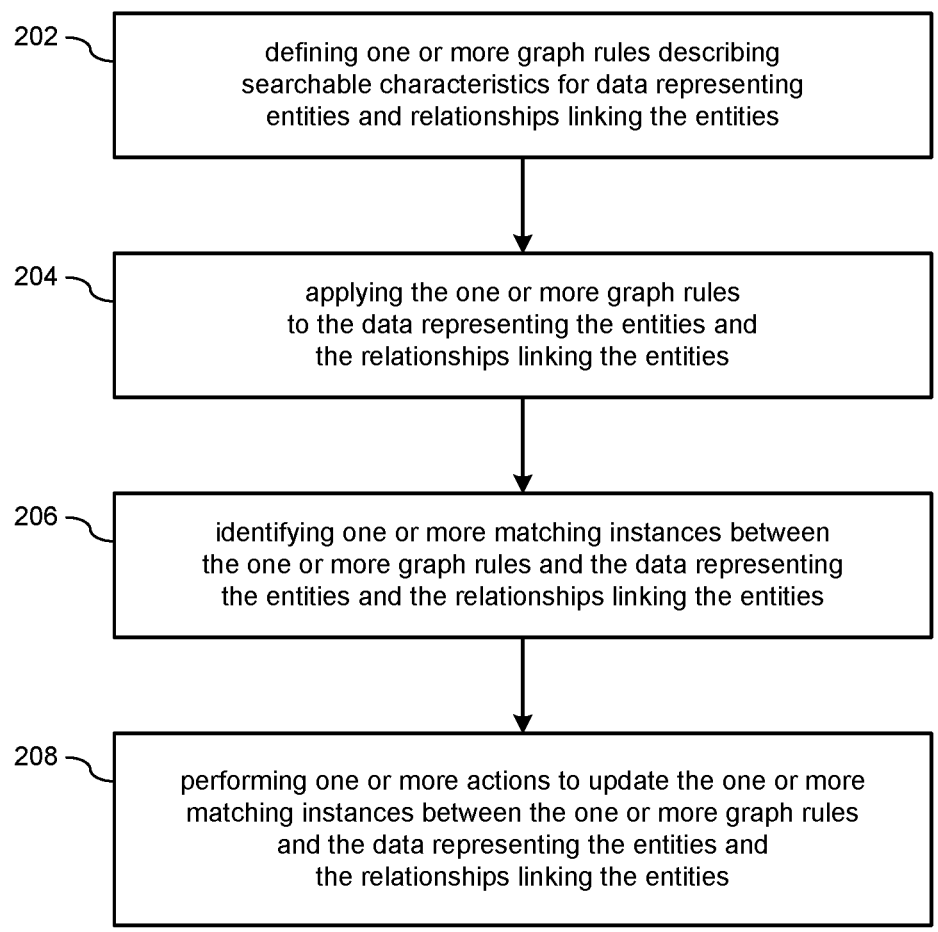
FIG. 2 is a process flow diagram illustrating an example method for multi-entity normalization, in accordance with aspects of the disclosure.

FIG. 2 is a process flow diagram illustrating an example method 200 for multi-entity normalization, in accordance with aspects of the disclosure. In the example of FIG. 2, operations 202-208 are illustrated as a series of discrete operations occurring in sequential order. However, in other implementations, two or more of the operations 202-208 may occur in a partially or completely overlapping or parallel manner, or in a nested or looped manner, or may occur in a different order than that shown. Further, additional operations, that may not be specifically shown in the example of FIG. 2, may be included in some other implementations, while, in still other implementations, one or more of the operations 202-208 may be omitted.

In various other implementations, the method 200 may include a process flow for a computer-implemented method for multi-entity normalization in the system 100 of FIG. 1. Further, as described herein, the operations 202-208 may provide a simplified operational process flow that may be enacted by the computer device 104 to provide features and functionalities as described in reference to FIG. 1.

In the example of FIG. 2, the method 200 may include a process flow for normalizing data representing entities and relationships linking the entities. At 202, the method 200 may include defining one or more graph rules describing searchable characteristics for data representing entities and relationships linking the entities. The one or more graph rules describing searchable characteristics may include describing at least one pattern related to the data representing the entities and the relationships linking the entities. The one or more graph rules describing searchable characteristics may include describing at least one semantic property related to the data representing the entities and the relationships linking the entities. The one or more graph rules describing searchable characteristics may include specifying at least one of an inclusion dependency and an exclusion dependency related to the data representing the entities and the relationships linking the entities. The one or more graph rules describing searchable characteristics may include specifying at least one attribute constraint related to the data representing the entities and the relationships linking the entities. The one or more graph rules describing searchable characteristics may include specifying at least one data value related to the data representing the entities and the relationships linking the entities. The one or more graph rules describing searchable characteristics may include specifying at least one token based approximation related to the data representing the entities and the relationships linking the entities. These and various other examples are described in greater detail herein in reference to FIGS. 3-8.

At 204, the method 200 may include applying the one or more graph rules to the data representing the entities and the relationships linking the entities, and at 206, the method 200 may include identifying one or more matching instances between the one or more graph rules and the data representing the entities and the relationships linking the entities. In an example, identifying the one or more matching instances may include identifying one or more matching instances having one or more discrepancies between the one or more graph rules and the data representing the entities and the relationships linking the entities. In another example, identifying one or more discrepancies may include at least one of flagging and/or logging the one or more discrepancies as exceptions for analysis.

At 208, the method 200 may include performing one or more actions to update the one or more matching instances between the one or more graph rules and the data representing the entities and the relationships linking the entities. In an example, performing the one or more actions to update the one or more matching instances may include at least one of generating a notification for the one or more matching instances, auto-correcting the one or more matching instances, and adjusting one or more attributes related to the one or more matching instances. In another example, performing the one or more actions to update the one or more matching instances may include cleaning the data by performing at least one of modifying one or more relationships linking the entities, modifying one or more entities, generating one or more additional entities, generating one or more additional relationships linking the entities.

In an implementation, performing the one or more actions to update the one or more matching instances may include performing one or more actions to mitigate one or more discrepancies identified between the one or more graph rules and the data representing the entities and the relationships linking the entities. In an example, performing one or more actions to mitigate one or more discrepancies may include at least one of generating a notification for the one or more discrepancies, auto-correcting the one or more discrepancies, and adjusting one or more attributes related to the one or more discrepancies. In another example, performing the one or more actions to mitigate one or more discrepancies may include cleaning the data by performing at least one of modifying one or more relationships linking the entities, modifying one or more entities, generating one or more additional entities, generating one or more additional relationships linking the entities.

In accordance with aspects of the disclosure, data stored in a database environment (e.g., CMDB) may be obtained and/or received from multiple discovery providers and integration engines, and in some instances, the data may be inconsistent and/or incomplete. In various examples, data stored in a database environment (e.g., CMDB) may include individual entities (e.g., CIs) along with a graph of interrelated entities (e.g., CIs) and relationships that may follow certain rules for being connected, linked, and/or interrelated. Properly maintaining graph models may be difficult due to model complexities and/or integration errors. Some examples of interrelationship errors in building models may include one or more of the following.

In an example, interrelationship errors may occur when using wrong type of relationship types. In another example, interrelationship errors may occur when using incorrect source and/or destination roles in a relationship (e.g., wrong arrows). In another example, interrelationship errors may occur when wrong dependency relationships exist between computer and software server and/or service and applications. In another example, interrelationship errors may occur when having product entities (e.g., CIs) with no parent computers, such as having orphan software entities (e.g., CIs). In another example, interrelationship errors may occur when having cluster entities (e.g., CIs) with no members or having cluster entities (e.g., CIs) with incorrect count of number of members. In another example, interrelationship errors may occur when missing relationships between two entities (e.g., CIs). In another example, interrelationship errors may occur when missing paths, such as when a virtual computer system entity (e.g., CI) is connected to a physical computer system entity (e.g., CI) through a direct relationship as well as through a two relationship model with a virtual system enabler entity (e.g., CI) and/or when application modeling patterns of having applications connected to software servers connected to computers, and other such models.

Accordingly, aspects of the disclosure may provide for ensuring that graph models of entities and relationships among the entities may be validated against one or more graph rules and corrected to result in clean graph models. Further, a normalization engine may be provided for multi-entity attribute correction that considers graph based pattern matching with multi-entity normalization. In an implementation, normalization techniques may be utilized for defining graph rules relating to multiple entities and relationships among the entities, applying the graph rules to the entities and relationships among the entities, and taking actions to update and/or correct the multiple entities and relationships among the entities. In some implementations, the graph rules may include a pattern of entities and relationships among the entities that may be described as a graph model including one or more semantic properties that the graph model may satisfy. In some other implementations, taking action may include auto-correcting graph models and/or suggesting candidates for correction when, for example, one or more of the graph rules identify exceptions, which may result in notification.

In various implementations, one or more graph rules may be defined such that each graph rule is configured to specify interrelationships among entities (e.g., CIs) and may include, for instance, at least 2 CIs and at least 1 relationship, which may describe a graph pattern that includes multiple entities (e.g., CIs) and relationships along with various additional semantic properties that may span multiple entities (e.g., CIs) and multiple relationships. In some examples, the graph patterns may include one or more of inclusion dependencies, exclusion dependencies, attribute constraints and qualifications, token similarity, and patterns with data values. These examples and other examples are described in greater detail herein.

Figure 3:
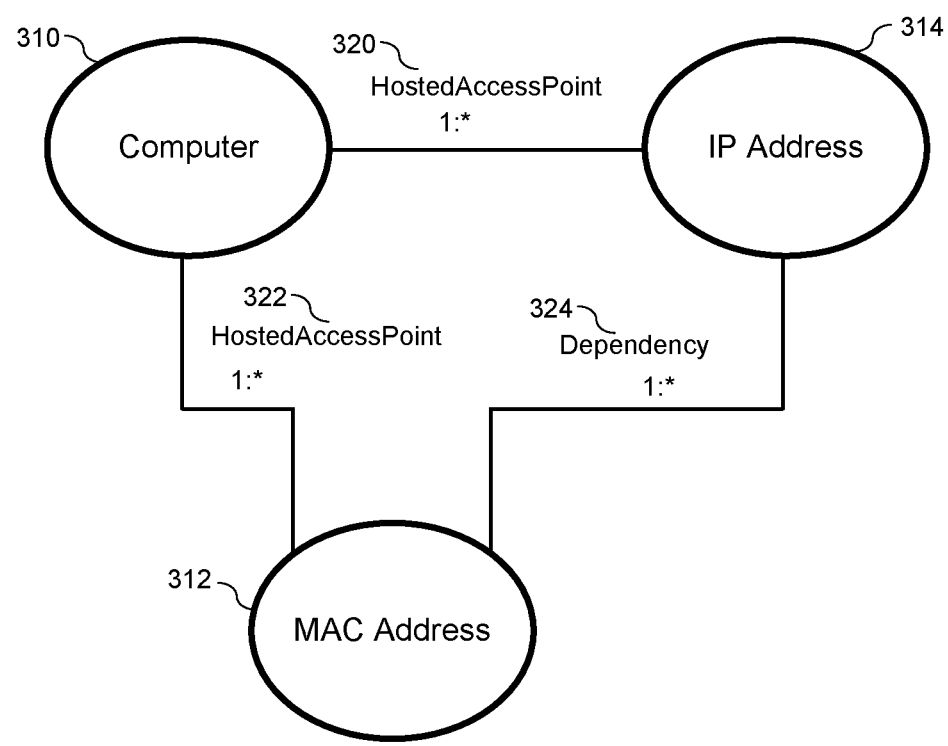
FIGS. 3-5 are relationship diagrams illustrating example graph rules for multi-entity normalization, in accordance with aspects of the disclosure.

FIG. 3 is a relationship diagram 300 illustrating example graph rules for multi-entity normalization, in accordance with aspects of the disclosure. In an example, a graph rule may be defined with 2 entity CIs and 1 relationship. For instance, a first graph rule may be defined as follows.

Rule 1: A product CI may be connected through a relationship, such as, for instance, HostedSystemComponent to one and only one Computer System.

Rule 1: [Product--- HostedSystemComponent(*:1)---Computer]

In some examples, graph rules may include complex graphs that define more than 2 entity CIs and 1 relationship.

For instance, in the example of FIG. 3, a graph rule may be defined to connect 3 entity CIs {Computer System 310, IP Address 314, and MAC Address 312} and 3 relationships (2 HostedAccessPoint relationships 320, 322 and Dependency 324) in a cycle. In this instance, a second graph rule may be defined as follows.

Rule 2: A computer system may be connected to one or more IP addresses through a HostedAccessPoint relationship, and each IP address may be connected to one and only one MAC address (Media Access Control layer address) through a Dependency relationship, where each MAC address may be connected back to the same computer system through a HostedAccessPoint relationship 310.

Rule 2: [Computer---(1:*) HostedSystemComponent—IP Address—

Dependency(*:1) --- MAC Address--- (same*:1) Computer]

In this instance, *, 1—denotes the cardinality relationship of these relationships at each end point.

Figure 4:
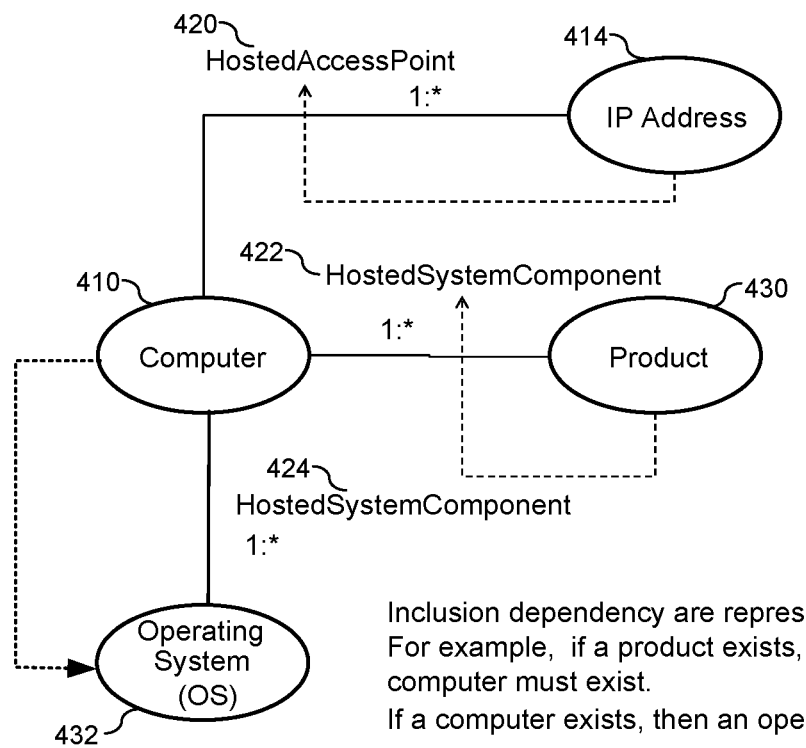

FIG. 4 is a relationship diagram 400 illustrating example graph rules for multi-entity normalization, in accordance with aspects of the disclosure. In the example of FIG. 4, various graph rules with inclusion and exclusion dependencies among multiple entity CIs and relationships. For instance, an inclusion dependency rule may be configured to specify that if a exists then b must exist where b can be an entity CI or a relationship. In another instance, an exclusion dependency rule may be configured to specify that if a exists then b cannot exist.

Rule 3a: [Orphan IP Address 414 should not exist] If an IP Address or MAC Address exists=>inclusion dependency=>a relationship HostedAccessPoint 420 to a computer 410 must exist.

Rule 3b: [Orphan Products 430 should not exist] If a Product CI exists=>a relationship HostedSystemComponent 422 to the computer 410 must exist.

Rule 4: [Every computer 410 must have an operating system 432] If a Computer exists=>inclusion dependency=>One OS object (Operating System object) must exist connected by a relationship HostedSystemComponent 424 to the computer 410. As shown in FIG. 4, inclusion dependency is represented by dotted lines. For example, if the product 430 exists, then the relationship 422 to the computer 410 must exist, and if the computer 410 exists, then an operating system 432 must exist.

In some examples, graph model rules with attribute constraints among multiple entity CIs and relationships. For instance, the entity CIs and relationships in a graph model have attributes associated with them. These attributes may have semantic rules associated with them that define interrelationships among the entity CIs. In an example, the attributes between the guest-host relationship must satisfy the constraint over attributes where one of the computer is virtual and other physical.

Rule 5: Computer1---(source:dest) Dependency--- Computer2
and Computer1.isVirtual=Yes and Computer2.isVirtual=No Rule 6: Cluster—Member relationship---Computer
Cluster.ClusterType=Hardware Cluster
Cluster.NumberOfNodes=COUNT(Member relationships)

In some examples, graph rules may be defined with data values. For instance, graph patterns may be considered generic or may be configured to specify data values. For example, referring to an application, computer may be a generic pattern that applies to all data values of applications. However, a graph pattern with data values may be more specific to an application as follows.

Rule 7: application(Name="Sharepoint")--dependency-
SoftwareServer(Name=% Sharepoint %, Type=Web Server)---dependency--
SoftwareServer(Type=DB Server)

In some examples, graph rules may need not be exact. For instance, in some real-world situations, approximate graph rules may need to be represented. An example of this may include a contract-organization model, where a contract cannot exist in isolation without 2 organizations. A contract document must mention the organization names as a part of a contract itself that matches with names of two organizations.

Figure 5:
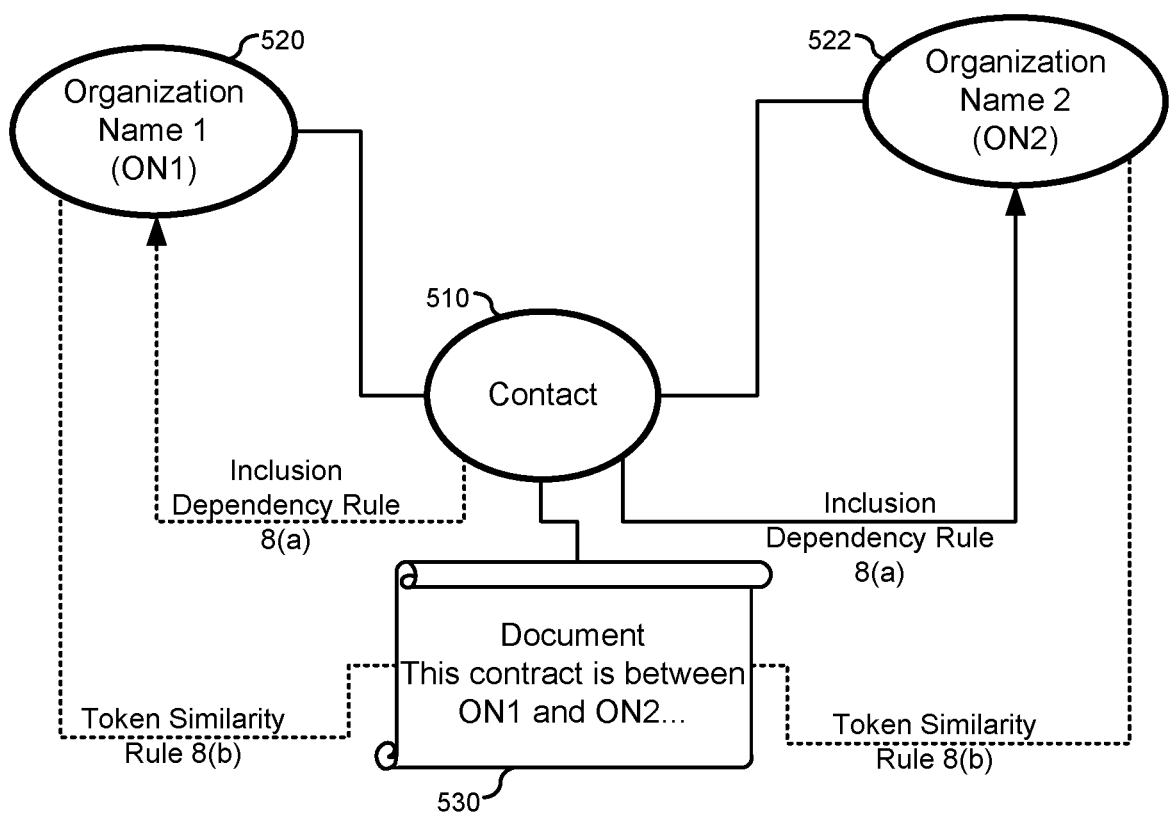

FIG. 5 is a relationship diagram 500 illustrating example graph rules for multi-entity normalization, in accordance with aspects of the disclosure. In the example of FIG. 5, various graph rules with inclusion and exclusion dependencies among multiple entity CIs and relationships.

Rule 8a: [Every contract must have two organizations and a service object that the contract is about] If a contract 510 exists=>inclusion dependence=>Two organization CIs 520, 522 and a service CI.

Rule 8b: [Every contract document 530 must refer to organization names (e.g., ON1, ON2) that the contract 510 is about] If the contract 510 exists and the contract document 530 exists=>token similarity=>Token similarity(Organization.Name, Contract Document).

In an instance, another example may include matching of software server (SS) names with product names. Even though exact matches may not be possible, token based approximate matching rule may be written to connect the appropriate software servers (SS) to appropriate products.

Figure 6:
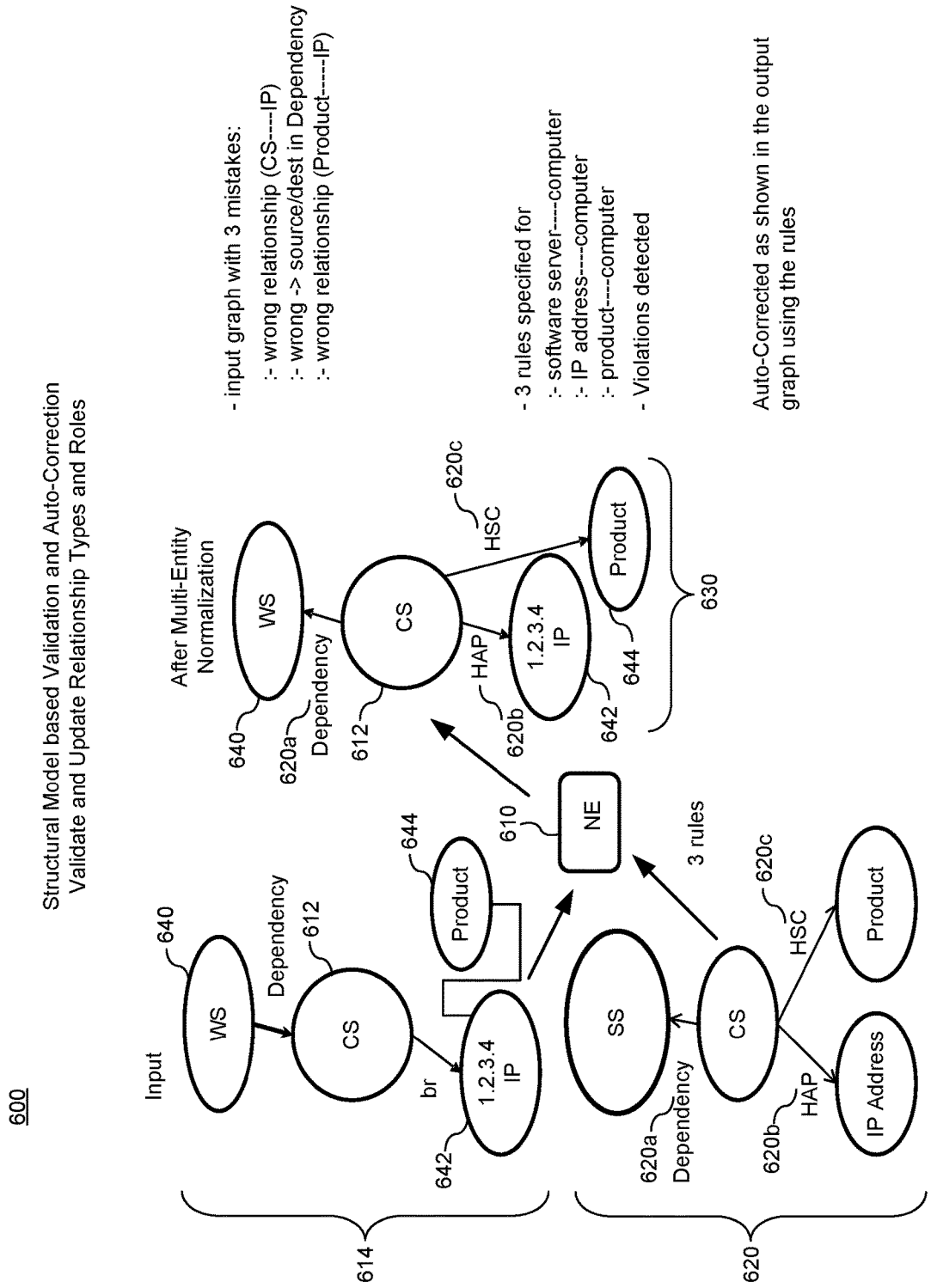
FIGS. 6-8 are relationship diagrams illustrating example structural model based validation and auto-correction, in accordance with aspects of the disclosure.

FIG. 6 is a relationship diagram 600 illustrating an example structural model based validation and auto-correction, in accordance with aspects of the disclosure. In various implementations, the system and methods may be configured to locate entity CI sub-graphs that do not meet the model graph rules. Once the graph rules are defined, the next step is to analyze the entity CI data by applying graph rules and then to determine if any rules are violated. If so, then specific actions may be taken in a step of notification or auto-correction.

In an implementation, a normalization engine (NE) 610 may be configured to validate and update relationship types and roles. For instance, the NE 610 may be configured to operate in a continuous mode where it finds an anchor CI, such as computer system (CS) 612, from which a graph walk may be achieved. For instance, as a graph 614 is built around each anchor CI, one or more graph rules 620 may be applied to the graph. In various examples, graph rules may be applied to one or more or all paths originating from an anchor CI as well as between multiple CIs that may not include the anchor CI. As shown in FIG. 6, the NE 610 may be configured to update the input graph 614 by applying the one or more graph rules 620 and generating an output graph 630.

In the example of FIG. 6, the input graph 614 includes multiple mistakes, such as a wrong relationship (CS-----IP), wrong direction pointer to source/destination in Dependency, and another wrong relationship (WS-----IP), where WS may include a web server (WS). The NE 610 may apply one or more graph rules 620 to the input graph 614 including software server (SS) 640=>computer (CS) 612, IP Address 642=>computer (CS) 612, and product 644=>computer (CS) 612. The graph rules 620 may include a Dependency rule 620a including software server (SS) 640=>computer (CS) 612, another Dependency rule 620b including IP Address 642=>computer (CS) 612, and another Dependency rule 620c including product 644=>computer (CS) 612. In an example, after violations are detected and after multi-entity normalization, the NE 610 may be configured to auto-correct the input graph 614 using the graph rules 620 and generate the output graph 630 with a corrected Dependency between the computer (CS) 612=>product 644, as shown in reference to the output graph 630.

For simple rule matching that may have 2 entity CIs and 1 relationship CI, the classes for the 2 entity CIs may be retrieved and then compared against the simple 2 entity CI rule. If the two end point classes match, then this rule may be evaluated. Then relationship type and role (direction) may be verified against the rule, and if it does not match, then there may be an exception. The attribute constraints may be matched to identify exceptions. Further, inclusion and exclusion dependencies may be ascertained if any to ensure that these are also validated. For complex graph rule matching, the above methodology may be applied for multiple entity CIs and relationships between the entity CIs taking part in the graph rule.

Continuing with graph rules examples, each computer CI and associated children of the computer CIs may include one or more of product CIs, IP Address CIs, and MAC Address CIs. In various examples, one or more of the graph rules may be applied to these as follows.

Rule 1 (product-computer relationship) is applied and passes for one or more all product CIs.

Rule 2 (computer-IP-MAC-computer) is applied to 3 CIs, when a match of the class types may exist. It may be determined that computer-IP and computer-MAC relationships may be considered acceptable, but IP-MAC relationships may be considered missing. Hence, Rule 2 may be identified as an incomplete model that may need to be corrected or notified to the user.

Rule 3 passes (no orphans for this computer).

Rule 4 (every computer must have an OS CI) fails, when an operating system CI associated with this computer system CI is not found.

Rule 5 and rule 6 do not apply since this computer is not connected to a cluster or another computer system.

In another embodiment where the CMDB data is stored in a relational database, NE 610 may be configured to operate in a batch mode and may use bulk queries to determine rule violations. For the simple rule of 2 entity CI and 1 relationship, this may translate to two SQL like queries where the difference between the sets of all pairs of CIs are found that have same class types and all pairs of CIs that match the graph rule. The set difference between these two results in those pairs of CIs which are related but not by the relationship may be required by the graph rule. Another method for this may include converting simple rules to a SQL form such as:

Rule: CI type=CT1---Rel type RT CI type=CT2
Converted to a SQL
Select all relationships where
Relationship.firstEndPointType=CT1 and
Relationship.secondEndPointType=CT2 and Relationship !=RT In various examples, complex graph rules may be converted into graph queries or equivalent SQL queries to determine the violations in a similar manner.

During actions and notifications, one or more or all of the exceptions and violations of graph rules may be logged appropriately so a user is able to take action to correct exceptions and violations. This may be achieved through one or several channels available, such as logging, error console, e-mail, and/or social media.

In various examples, auto-correction may involve a number of different methods that may involve changing types of relationships, changing types of entity CIs, creating entity CIs, creating relationships, etc. An example method may include using graph rules to update and/or create missing relationships and attribute values across one or more relationships. For instance, when a graph rule is violated, at times, it may be considered possible to determine corrections needed to the model using the graph rule itself. In cases of the simple rule where there is a relationship between 2 CIs that is of wrong type or is of wrong role and direction, this may be automatically corrected.

Figure 7:
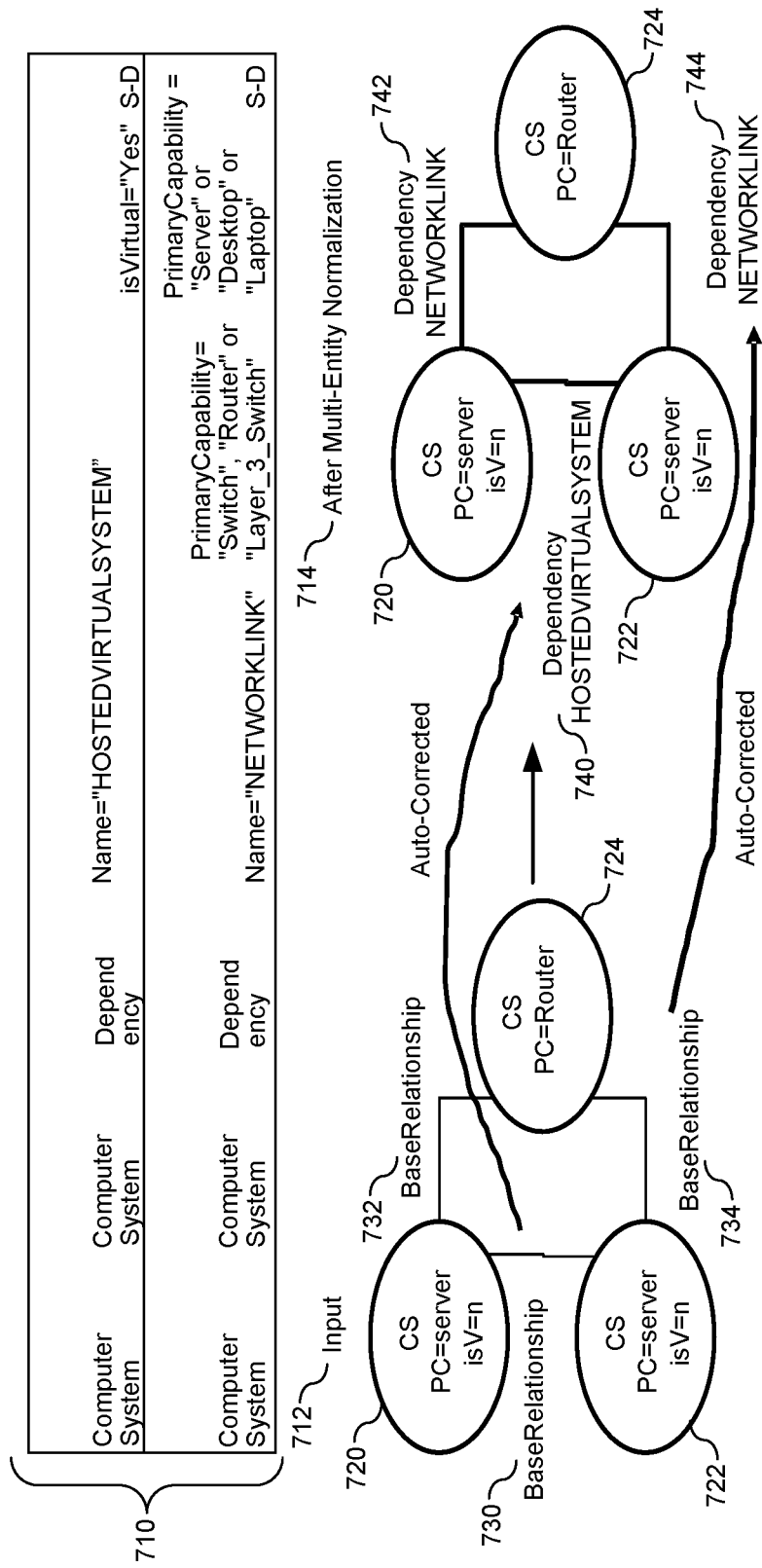

FIG. 7 is a relationship diagram 700 illustrating an example structural model based validation and auto-correction, in accordance with aspects of the disclosure. In the example of FIG. 7, one or more attribute constraints 710 may be used to find violations, wherein attribute constraints specified in the graph rules may help disambiguate the graph rules and use the right graph rule for correction.

For instance, an input graph 712 may include 3 computer systems 720, 722, 724 and 3 relationships 730, 732, 734 respectively defined therebetween. After violations are detected and after multi-entity normalization, the normalization engine may be configured to auto-correct the input graph 712 using the attributes 710 and generate the output graph 714 with corrected Dependencies 710, 742, 744 between the 3 computers 720, 722, 724, respectively. In various examples, relationship checking may involve checking for <<conditions>> on source and destination entity CIs, which may be useful in resolving ambiguities.

Figure 8:
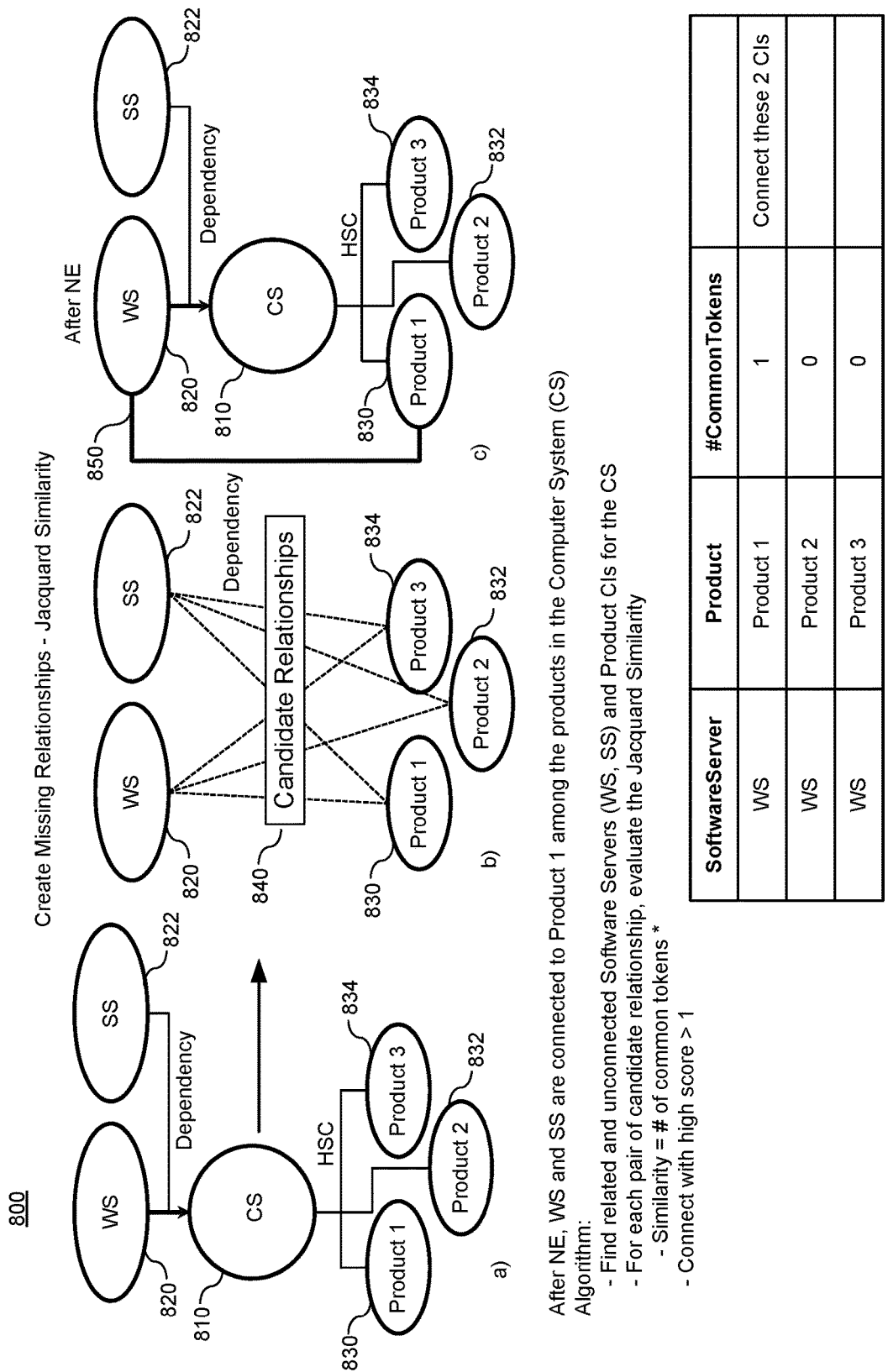

FIG. 8 is a relationship diagram 800 illustrating an example structural model based validation and auto-correction, in accordance with aspects of the disclosure. In the example of FIG. 8, missing relationships between one or more entity CIs may be created using Jacquard token matching similarity rules For instance, one or more missing relationships may be found by using token based similarity techniques, such as Jacquard similarity. When finding missing relationships, one or more or all related entity CIs that have violated one or more graph rules may be found and token similarity may be applied to match these. As an example, from a graph walk of a computer system CI 810 (CS), one or more or all related software server CIs 820 (web server WS), 822 (software server SS) and product CIs 830 (Product 1), 832 (Product 2), 834 (Product 3) may be found that have violated an inclusion dependency rule that specifies that there must always be a relationship from a software server CI to a product CI as shown in part a. In this case, attributes such as Name, Manufacturer, and Model may be compared among these one or more or all pairs of candidate relationships as shown in part b. Based on a degree of match among the software servers 820 (WS), 822 (SS) and product CIs 830 (Product 1), 832 (Product 2), 834 (Product 3), a best of candidate relationships 840 may be selected that includes a highest score of overlapping names. If there are multiple high scores on similarity matching, then these may be presented to the user as most likely options for missing relationships. As such, as shown in part c, a Dependency 850 may be applied to the graph to define a relationship between the software server 820 (WS) and the product CI 830 (Product 1) after multi-entity normalization by a normalization engine.

In another example, missing relationships between one or more entity CIs may be created using cardinality rules on a singleton CI. In some situations, there may be a set of CIs related to a target CI through a many:1 relationship, and there may only be a single instance of the target CI (singleton condition). If the above conditions are valid, then it may be safe to propose that the set of CIs may be related to the target CI through the missing relationships. For example, if there are a bunch of IP Addresses and a single MAC Address CI all connected to a computer system, there may be a high likelihood that the bunch of IP Addresses are related to the available MAC Address CI through a dependency relationship since there is only a single instance of MAC Address in that computer. However, the above rule may not be applied if there are multiple MAC Addresses assigned to a computer system. These heuristics may be applied to propose common sense relationship connections among CIs.

In accordance with aspects of the disclosure, an advantage may include zero modeling errors for better data quality in database environments (e.g., CMDB) and better results by consuming applications, such as, for example, licensing and service impact modeling applications. Another advantage may include reducing time to value integrations with a normalization engine (NE) that may be configured to spot incorrect models and notify users or auto-correct in some instances. Another advantage may include a next frontier of normalization that works on graphs versus existing technology and/or implementation that works on a single record at a time.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, comprising:
    retrieving data from a plurality of data providers, wherein the data represents entities and relationships between the entities;
    defining a plurality of rules for a graph model, the graph model defining a plurality of data patterns and the relationships between the entities including dependencies between the entities;
    searching the data using the plurality of rules, the searching including comparing the plurality of data patterns in the rules to a structure associated with the data;
    in response to determining that at least a portion of the structure associated with the data matches at least one of the plurality of data patterns in the rules, assessing whether the data includes one or more interrelationship errors that result in a violation of at least one of the plurality of rules, wherein the one or more interrelationship errors include a wrong dependency relationship;
    in response to determining that the data includes one or more interrelationship errors, correcting, using the at least one rule, the interrelationship errors in the structure to generate corrected data and corrected structure of the data, wherein the correcting includes automatic correction of the graph model; and
    generating an updated graph model that includes the corrected data and the corrected structure of the data.

2. The method of claim 1, wherein the entities represent computing objects in a network and wherein determining that the data includes one or more interrelationship errors includes detecting whether any of the computing objects includes an orphan entity.

3. The method of claim 2, wherein detecting whether any of the computing objects includes an orphan entity includes detecting an extraneous IP address associated with computing objects without an assigned parent computing object.

4. The method of claim 1, wherein the entities represent data objects in a network and wherein determining that the data includes one or more interrelationship errors includes detecting whether the data objects violate a licensing model or a service model associated with the graph model.

5. The method of claim 1, wherein determining that the data includes one or more interrelationship errors includes detecting whether a cluster of the entities includes a predefined number of members based at least in part on the plurality of rules.

6. The method of claim 1, wherein the entities represent data objects in a network and wherein determining that the data includes one or more interrelationship errors includes detecting whether any of the data objects are connected to a physical computer system entity through a direct relationship and a two relationship model with a virtual system entity.

7. The method of claim 1, wherein generating the corrected data and the corrected structure of the data includes:
    suggesting candidate corrections to modify the structure to adhere to at least one valid pattern defined in at least one of the plurality of rules; and
    modifying the structure using the suggested candidate corrections.

8. A computer program product including instructions recorded on a non-transitory computer-readable storage medium and comprising instructions that, when executed by at least one processor, cause the at least one processor to:
    retrieve data from a plurality of data providers, wherein the data represents entities and relationships between the entities;
    define a plurality of rules for a graph model, the graph model defining a plurality of data patterns and the relationships between the entities including dependencies between the entities;
    search the data using the plurality of rules, the search including comparing the plurality of data patterns in the rules to a structure associated with the data;
    in response to determining that at least a portion of the structure associated with the data matches at least one of the plurality of data patterns in the rules, assess whether the data includes one or more interrelationship errors that result in a violation of at least one of the plurality of rules, wherein the one or more interrelationship errors include a wrong dependency relationship;

in response to determining that the data includes one or more interrelationship errors, correct, using the at least one rule, the interrelationship errors in the structure to generate corrected data and corrected structure of the data, wherein the correcting includes automatic correction of the graph model; and generate an updated graph model that includes the corrected data and the corrected structure of the data.

9. The computer program product of claim 8, wherein the entities represent computing objects in a network and wherein determining that the data includes one or more interrelationship errors includes detecting whether any of the computing objects includes an orphan entity.

10. The computer program product of claim 9, wherein detecting whether any of the computing objects includes an orphan entity includes detecting an extraneous IP address associated with computing objects without an assigned parent computing object.

11. The computer program product of claim 8, wherein the entities represent data objects in a network and wherein determining that the data includes one or more interrelationship errors includes detecting whether the data objects violate a licensing model or a service model associated with the graph model.

12. The computer program product of claim 8, wherein determining that the data includes one or more interrelationship errors includes detecting whether a cluster of the entities includes a predefined number of members based at least in part on the plurality of rules.

13. The computer program product of claim 8, wherein the entities represent data objects in a network and wherein determining that the data includes one or more interrelationship errors includes detecting whether any of the data objects are connected to a physical computer system entity through a direct relationship and a two relationship model with a virtual system entity.

14. The computer program product of claim 8, wherein generating the corrected data and the corrected structure of the data includes:

suggesting candidate corrections to modify the structure to adhere to at least one valid pattern defined in at least one of the plurality of rules; and modifying the structure using the suggested candidate corrections.

15. A computer implemented system including instructions recorded on a non-transitory computer-readable medium and executable by at least one processor, the system comprising at least one processor configured to:

retrieve data from a plurality of data providers, wherein the data represents entities and relationships between the entities;

define a plurality of rules for a graph model, the graph model defining a plurality of data patterns and the relationships between the entities including dependencies between the entities;

search the data using the plurality of rules, the search including comparing the plurality of data patterns in the rules to a structure associated with the data;

in response to determining that at least a portion of the structure associated with the data matches at least one of the plurality of data patterns in the rules, assess whether the data includes one or more interrelationship errors that result in a violation of at least one of the plurality of rules, wherein the one or more interrelationship errors include a wrong dependency relationship;

in response to determining that the data includes one or more interrelationship errors, correct, using the at least one rule, the interrelationship errors in the structure to generate corrected data and corrected structure of the data, wherein the correcting includes automatic correction of the graph model; and generate an updated graph model that includes the corrected data and the corrected structure of the data.

16. The computer implemented system of claim 15, wherein the entities represent computing objects in a network and wherein determining that the data includes one or more interrelationship errors includes detecting whether any of the computing objects includes an orphan entity.

17. The computer implemented system of claim 15, wherein the entities represent data objects in a network and wherein determining that the data includes one or more interrelationship errors includes detecting whether the data objects violate a licensing model or a service model associated with the graph model.

18. The computer implemented system of claim 15, wherein determining that the data includes one or more interrelationship errors includes detecting whether a cluster of the entities includes a predefined number of members based at least in part on the plurality of rules.

19. The computer implemented system of claim 15, wherein the entities represent data objects in a network and wherein determining that the data includes one or more interrelationship errors includes detecting whether any of the data objects are connected to a physical computer system entity through a direct relationship and a two relationship model with a virtual system entity.

20. The computer implemented system of claim 15, wherein generating the corrected data and the corrected structure of the data includes:

suggesting candidate corrections to modify the structure to adhere to at least one valid pattern defined in at least one of the plurality of rules; and modifying the structure using the suggested candidate corrections.

\* \* \* \* \*